US007747532B2

(12) United States Patent
Wakimoto

(10) Patent No.: US 7,747,532 B2
(45) Date of Patent: Jun. 29, 2010

(54) CONTENT USE MANAGEMENT SYSTEM, CONTENT PLAYBACK APPARATUS, CONTENT USE MANAGEMENT METHOD, CONTENT PLAYBACK METHOD, AND COMPUTER PROGRAM INCLUDING SYSTEM DATE/TIME INFORMATION VALIDATION

(75) Inventor: Hideyoshi Wakimoto, Saitama (JP)

(73) Assignee: Sony Corporation, Tokyo (JP)

( * ) Notice: Subject to any disclaimer, the term of this patent is extended or adjusted under 35 U.S.C. 154(b) by 1107 days.

(21) Appl. No.: 10/968,071

(22) Filed: Oct. 20, 2004

(65) Prior Publication Data

US 2005/0102237 A1    May 12, 2005

(30) Foreign Application Priority Data

Nov. 10, 2003    (JP)    ............................ P2003-380285

(51) Int. Cl.
 *H04K 1/00* (2006.01)
 *H04L 9/00* (2006.01)
(52) U.S. Cl. ............................ 705/59; 705/51; 705/57; 705/71; 705/75
(58) Field of Classification Search .................... 705/59
 See application file for complete search history.

(56) References Cited

U.S. PATENT DOCUMENTS 5,703,950 A * 12/1997 Jovanovich et al. ......... 380/249
6,567,107 B1 * 5/2003 Stannard ..................... 715/764
7,366,834 B2 * 4/2008 McGovern et al. .......... 711/112
2002/0002466 A1 * 1/2002 Kambayashi et al. .......... 705/1
2002/0046181 A1 * 4/2002 Story et al. ................... 705/59
2002/0161718 A1 * 10/2002 Coley et al. .................. 705/59
2002/0194010 A1 * 12/2002 Bergler et al. ................. 705/1
2003/0069854 A1 * 4/2003 Hsu et al. ..................... 705/59
2003/0177149 A1 * 9/2003 Coombs ..................... 707/204
2003/0195855 A1 * 10/2003 Parks et al. .................. 705/51
2003/0233553 A1 * 12/2003 Parks et al. ................. 713/178
2004/0049521 A1 * 3/2004 Borrowman ............. 707/104.1
2004/0236788 A1   11/2004 Sato et al.
2005/0038753 A1 * 2/2005 Yen et al. ..................... 705/59
2006/0265337 A1 * 11/2006 Wesinger, Jr. ................ 705/65

FOREIGN PATENT DOCUMENTS

| JP | 2002-258965 | 9/2002 |
|---|---|---|
| JP | 2003-22339 | 1/2003 |
| JP | 2003-59180 | 2/2003 |
| WO | WO 03/012708 A1 | 2/2003 |

* cited by examiner

*Primary Examiner*—Calvin L Hewitt, II
*Assistant Examiner*—Dante Ravetti
(74) *Attorney, Agent, or Firm*—Oblon, Spivak, McClelland, Maier & Neustadt, L.L.P.

(57) ABSTRACT

A license corresponding to digital content includes reliable reference date/time information. A content playback apparatus includes a reference-date/time-information storage unit for storing the reference date/time information. The reference-date/time-information storage unit is updated to maintain the reference date/time information at the latest version. When the digital content is to be played back, the system date/time of the content playback apparatus is compared with the reference date/time to validate the system date/time.

20 Claims, 13 Drawing Sheets

| | 502 | 504 | 506 | 508 |
|---|---|---|---|---|
| | LICENSE ID | CONTENT ID | USER ID | AVAILABLE PERIOD OF TIME |
| | 000001 | 000100 | 123456 | 2003/10/27 − 2003/10/31 |
| | 000002 | 000150 | 001003 | 2003/10/29 − 2003/11/5 |
| | 000003 | 002300 | 001022 | 2003/11/3 − 2003/11/10 |
| | ⋮ | ⋮ | ⋮ | ⋮ |
| | 220000 | 013300 | 111111 | 2003/11/1 − 2003/11/7 |

CONTENT USE MANAGEMENT SYSTEM, CONTENT PLAYBACK APPARATUS, CONTENT USE MANAGEMENT METHOD, CONTENT PLAYBACK METHOD, AND COMPUTER PROGRAM INCLUDING SYSTEM DATE/TIME INFORMATION VALIDATION

BACKGROUND OF THE INVENTION

1. Field of the Invention

The present invention relates to content use management systems, content playback apparatuses, content use management methods, content playback methods, and computer programs for digital content.

2. Description of the Related Art

Recently, many users access various types of digital content including text content, such as newspapers and books, music content, and video content, such as movies, by the use of information processing apparatuses, including personal computers (PCs) and portable terminals such as Personal Digital Assistants (PDAs) and mobile phones. The available time of such digital content is restricted in some cases, just as, for example, video-rental shops and libraries allow their videocassettes and books to be available only within a limited period of time.

The available time of digital content is restricted such that, for example, digital content itself or a license for managing the digital content is assigned an available time, which is compared with the system date/time of the information processing apparatus with which the digital content is used to determine whether or not the user is entitled to the digital content.

However, since the system date/time of an information processing apparatus is accessible by the user, the user can easily override the available time by changing the system date/time. Thus, the known system has a problem in that the user can freely use digital content even if the digital content has a restricted available time.

To overcome this problem, Japanese Unexamined Patent Application Publication No. 2003-22339 proposes a content management system where reliable reference date/time information is saved in, for example, an information processing apparatus with which digital content is to be used, so that it is determined whether or not the user is entitled to the digital content on the basis of the reference date/time information and the system date/time.

According to the above-described content management system, however, if the saved reference date/time information is destroyed, it is necessary to acquire new reference date/time information from a reliable external server via a communication network to restore the destroyed date/time information. This means that if the user is in an environment where no connection to a communication network is available, the destroyed reference date/time information cannot be restored, that is, a determination cannot be made as to whether or not the user is entitled to the digital content.

SUMMARY OF THE INVENTION

In view of the problem described above, an object of the present invention is to provide a content use management system that can acquire information required to manage the use of digital content even in an environment where no connection to a communication network is available so that a determination can be made as to whether or not the user is entitled to the digital content.

According to an aspect of the present invention, a content use management system includes a license issuance apparatus for issuing a license corresponding to digital content and a content playback apparatus for using the digital content with the license. The license issuance apparatus includes a license generation unit for generating a license including at least content identification information for uniquely identifying the digital content, available-period-of-time information for defining a period of time within which the digital content can be used, and reference date/time information; and a license issuance unit for issuing the license. The content playback apparatus includes a license acquisition unit for acquiring the license; a license storage unit for storing the license; a reference-date/time-information storage unit for storing the reference date/time information included in the license; a reference-date/time-information update unit for carrying out updating to maintain the reference date/time information stored in the reference-date/time-information storage unit at the latest version; and a system-date/time-information acquisition unit for acquiring system date/time information in the content playback apparatus. In this content use management system, it is determined whether or not the digital content corresponding to the content identification information can be used according to the reference date/time information, the system date/time information, and the available-period-of-time information.

According to the present invention, when the use of digital content having a restricted available time is managed, illegal operations on the system date/time of the content playback apparatus can be detected. Furthermore, since information in the license is used to detect an illegal operation on the system date/time, information required to manage the use of digital content can be obtained even in an environment where no connection to a communication network is possible.

The content playback apparatus may further include a backup information storage unit for storing the reference date/time information; and a backup information update unit for carrying out updating to maintain the reference date/time information stored in the backup information storage unit at the latest version. If the reference-date/time-information storage unit is invalid, the reference-date/time-information storage unit is restored by using the reference date/time information stored in the backup information storage unit. With this structure, even if information required to manage the use of digital content cannot be used due to, for example, an illegal operation or a failure, the information can be restored using the backup information storage unit without connecting to a communication network.

According to another aspect of the present invention, a content playback apparatus for using digital content with a license corresponding to the digital content is provided. The content playback apparatus includes a license acquisition unit for acquiring the license; a license storage unit for storing the license; a reference-date/time-information storage unit for storing reference date/time information included in the license; a reference-date/time-information update unit for carrying out updating to maintain the reference date/time information stored in the reference-date/time-information storage unit at the latest version; and a system-date/time-information acquisition unit for acquiring system date/time information of the content playback apparatus. In the content playback apparatus, it is determined whether or not the digital content can be used according to the reference date/time information, the system date/time information, and available-period-of-time information for determining a period of time within which the digital content can be used.

According to the present invention, when the use of digital content having a restricted available time is managed, illegal operations on the system date/time of the content playback apparatus can be detected. Furthermore, since information in the license is used to detect an illegal operation on the system date/time, information required to manage the use of digital content can be obtained even in an environment where no connection to a communication network is possible.

The content playback apparatus may be constructed so as to further include a validation unit for determining the validity of the system date/time information by comparing the system date/time information with the reference date/time information. With this structure, an illegal operation on the system date/time of the content playback apparatus can be detected.

The content playback apparatus may be constructed so as to further include a backup information storage unit for storing the reference date/time information; a backup information update unit for carrying out updating to maintain the reference date/time information stored in the backup information storage unit at the latest version; and a reference-date/time-information restoration unit, wherein if the reference-date/time-information storage unit is invalid, the reference-date/time-information restoration unit restores the reference-date/time-information storage unit by using the reference date/time information stored in the backup information storage unit. With this structure, even if information required to manage the use of digital content cannot be used due to, for example, an illegal operation or a failure, the information can be restored using the backup information storage unit without connecting to a communication network.

The content playback apparatus may be constructed such that if the reference-date/time-information storage unit and the backup information storage unit are invalid, the reference-date/time-information restoration unit carries out restoration by searching for a latest license from among at least one license stored in the license storage unit and using the reference date/time information included in the latest license. With this structure, even if information required to manage the use of digital content cannot be used due to, for example, an illegal operation or a failure and even if the backup information storage unit for restoration cannot be used, the information can be restored using the latest license without connecting to a communication network.

The content playback apparatus may be constructed such that the backup information storage unit stores information for uniquely identifying the reference-date/time-information storage unit. With this structure, an illegal operation on the reference-date/time-information storage unit can be detected.

The content playback apparatus may be constructed such that at least one of the reference-date/time-information storage unit and the backup information storage unit stores information for uniquely identifying the stored reference date/time information. With this structure, an illegal operation on the reference date/time information can be detected.

According to still another aspect of the present invention, a content use management method with a license issuance apparatus for issuing a license corresponding to digital content and a content playback apparatus for using the digital content with the license is provided. This content use management method includes the steps of generating in the license issuance apparatus a license including at least content identification information for uniquely identifying the digital content, available-period-of-time information for defining a period of time within which the digital content can be used, and reference date/time information; issuing the license from the license issuance apparatus; acquiring the license in the content playback apparatus; storing the license in a license storage unit of the content playback apparatus; storing the reference date/time information included in the license in a reference-date/time-information storage unit of the content playback apparatus; acquiring system date/time information of the content playback apparatus; and determining in the content playback apparatus whether or not the digital content corresponding to the content identification information can be used according to the reference date/time information, the system date/time information, and the available-period-of-time information.

According to the present invention, when the use of digital content having a restricted available time is managed, illegal operations on the system date/time of the content playback apparatus can be detected. Furthermore, since information in the license is used to detect an illegal operation on the system date/time, information required to manage the use of digital content can be obtained even in an environment where no connection to a communication network is possible.

According to still another aspect of the present invention, a content playback method by a content playback apparatus for using digital content with a license corresponding to the digital content is provided. This content playback method includes the steps of acquiring the license in the content playback apparatus; storing the license in a license storage unit of the content playback apparatus; storing reference date/time information included in the license in a reference-date/time-information storage unit of the content playback apparatus; acquiring system date/time information of the content playback apparatus; and determining in the content playback apparatus whether or not the digital content can be used according to the reference date/time information, the system date/time information, and available-period-of-time information for determining a period of time within which the digital content can be used.

According to the present invention, when the use of digital content having a restricted available time is managed, illegal operations on the system date/time of the content playback apparatus can be detected. Furthermore, since information in the license is used to detect an illegal operation on the system date/time, information required to manage the use of digital content can be obtained even in an environment where no connection to a communication network is possible.

The above-described determining step may include the step of determining the validity of the system date/time information by comparing the system date/time information with the reference date/time information.

The content playback method may further include the steps of storing the reference date/time information in a backup information storage unit; and restoring the reference-date/time-information storage unit by using the reference date/time information stored in the backup information storage unit if the reference-date/time-information storage unit is invalid.

The content playback method may further include the steps of searching for a latest license from among at least one license stored in the license storage unit if the reference-date/time-information storage unit and the backup information storage unit are invalid; and carrying out restoration using the reference date/time information included in the latest license.

The content playback method may further include the steps of storing information for uniquely identifying the reference-date/time-information storage unit in the backup information storage unit; and verifying the validity of the reference-date/time-information storage unit using the information for uniquely identifying the reference-date/time-information storage unit.

The content playback method may further include the steps of storing information for uniquely identifying the stored reference date/time information in at least one of the reference-date/time-information storage unit and the backup information storage unit; and verifying the validity of the reference date/time information using the information for uniquely identifying the reference date/time information.

According to another aspect of the present invention, a computer-executable program for a content playback apparatus for using digital content with a license corresponding to the digital content is provided. The computer-executable program includes a license acquisition unit for acquiring the license; a license storage unit for storing the license; a reference-date/time-information storage unit for storing reference date/time information included in the license; a reference-date/time-information update unit for carrying out updating to maintain the reference date/time information stored in the reference-date/time-information storage unit at the latest version; and a system-date/time-information acquisition unit for acquiring system date/time information of the content playback apparatus. In this program, it is determined whether or not the digital content can be used according to the reference date/time information, the system date/time information, and available-period-of-time information for determining a period of time within which the digital content can be used.

According to the present invention, when the use of digital content having a restricted available time is managed, illegal operations on the system date/time of the content playback apparatus can be detected. Furthermore, since information in the license is used to detect an illegal operation on the system date/time, information required to manage the use of digital content can be obtained even in an environment where no connection to a communication network is possible.

The computer-executable program may be constructed so as to further include a validation unit for determining the validity of the system date/time information by comparing the system date/time information with the reference date/time information.

The computer-executable program may be constructed so as to further include a backup information storage unit for storing the reference date/time information; a backup information update unit for carrying out updating to maintain the reference date/time information stored in the backup information storage unit at the latest version; and a reference-date/time-information restoration unit, wherein if the reference-date/time-information storage unit is invalid, the reference-date/time-information restoration unit restores the reference-date/time-information storage unit by using the reference date/time information stored in the backup information storage unit.

The computer-executable program may be constructed such that if the reference-date/time-information storage unit and the backup information storage unit are invalid, the reference-date/time-information restoration unit carries out restoration by searching for a latest license from among at least one license stored in the license storage unit and using the reference date/time information included in the latest license.

The computer-executable program may be constructed such that information for uniquely identifying the reference-date/time-information storage unit is stored in the backup information storage unit.

The computer-executable program may be constructed such that information for uniquely identifying the stored reference date/time information is stored in at least one of the reference-date/time-information storage unit and the backup information storage unit.

As described above, the present invention provides a content use management system that can acquire information required to manage the use of digital content even in an environment where no connection to a communication network is available.

BRIEF DESCRIPTION OF THE DRAWINGS

FIG. 5 is an illustration of license information storage means according to an embodiment of the present invention;

DESCRIPTION OF THE PREFERRED EMBODIMENTS

Figure 1:
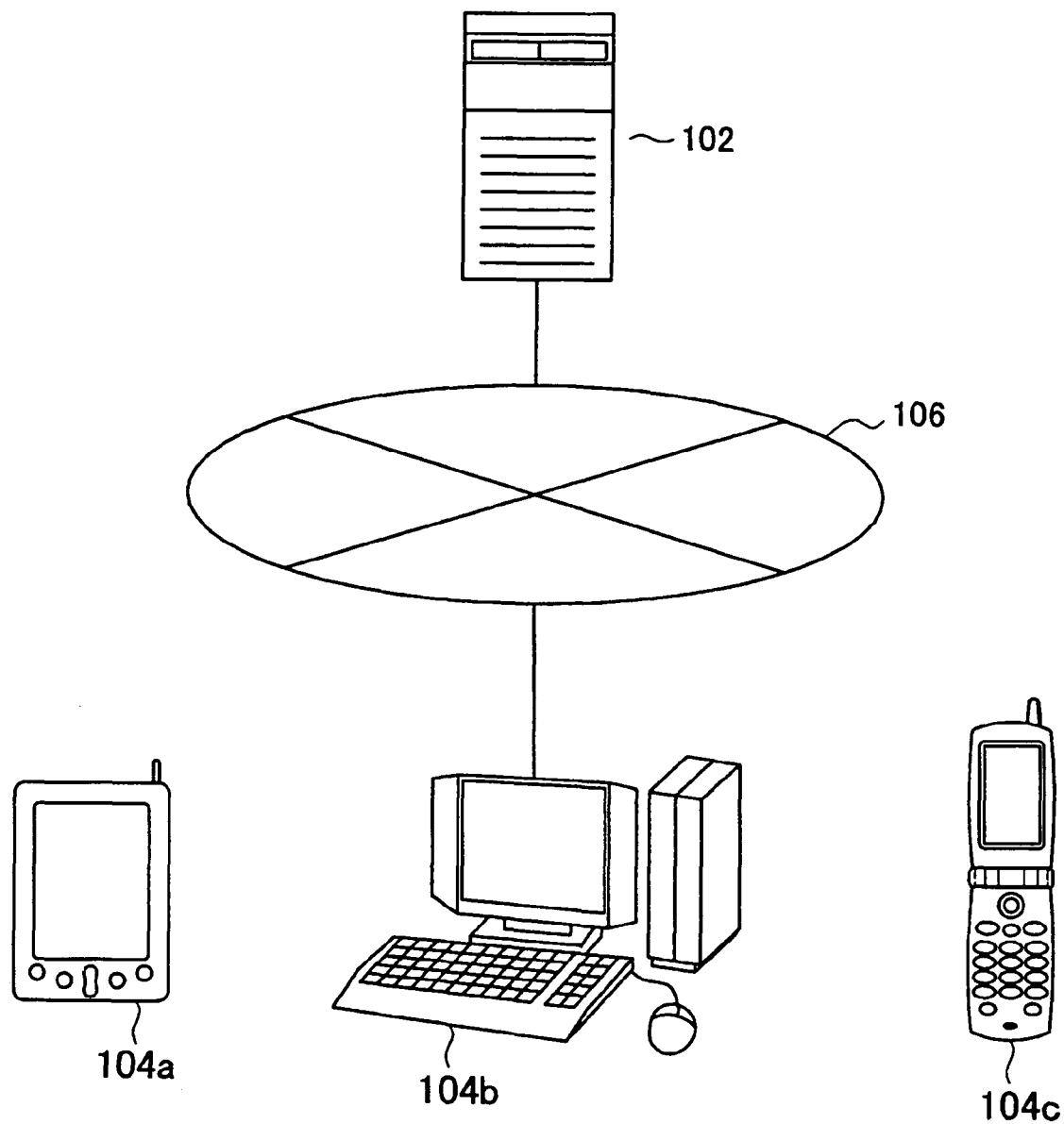
FIG. 1 is a schematic block diagram of a content use management system according to an embodiment of the present invention.

Preferred embodiments according to the present invention will now be described in detail with reference to the attached drawings. In the following description and drawings, the components having substantially the same functions are assigned the same reference numerals, and will not be described in duplicate.

Content Use Management System

A content use management system according to the present invention will now be described by way of an embodiment applied to a content use management system 100 shown in FIG. 1, which is a schematic block diagram of the content use management system 100. The entire structure of the content use management system 100 according to this embodiment will first be described with reference to FIG. 1.

The content use management system 100 includes a license issuance apparatus 102, content playback apparatuses 104a, 104b, 104c, etc. (hereinafter, referred to as content playback apparatuses 104 collectively), and a communication network 106. The license issuance apparatus 102 may transmit a license to, for example, the content playback apparatus 104b, which is connectable to the communication network 106, via the communication network 106, or issue a license to, for example, the content playback apparatus 104a, which is not connected to the communication network 106, via an external storage medium, such as a Floppy® Disk or a compact disk having the license stored therein. Alternatively, the license issuance apparatus 102 may supply a license to the target content playback apparatus 104a, 104b, or 104c by transmitting the license to another personal computer (not shown in the figure) connected to the communication network 106 and then passing the license from the personal computer to the target content playback apparatus via a network (not shown in the figure) such as the communication network 106 or another LAN, a connection interface such as USB, or an external storage medium. Thus, the communication network 106 may be omitted from the content use management system 100.

The license issuance apparatus 102 has a function for issuing licenses corresponding to various types of digital content including text content, such as books and newspapers, image content, music content, and video content. A license includes information for restricting the use of the digital content. One example of a license according to this embodiment will be described below. The license issuance apparatus 102 may be constructed so as to issue digital content corresponding to a license to be issued along with the license, or digital content may be managed and issued by another apparatus (not shown in the figure). As described above, the license issuance apparatuses 102 are not necessarily connected to the communication network 106.

The content playback apparatuses 104a, 104b, 104c, etc. have a function for playing back the digital content corresponding to a license to be issued by the license issuance apparatus 102. Thus, the content playback apparatuses 104a, 104b, 104c, etc. are used by users to access digital content. As described above, the content playback apparatuses 104 are not necessarily connected to the communication network 106.

The communication network 106 is realized by, for example, a telephone line or a dedicated line that allows two-way communication, and has a function for bidirectionally distributing a license and other information according to this embodiment. The communication network 106 includes the Internet, and may be a wired or wireless network. The license issuance apparatus 102 and the content playback apparatuses 104 may be connected to each other for intercommunication via the communication network 106, but they do not need to be connected to each other.

The structures of the license issuance apparatus 102 and the content playback apparatuses 104 according to this embodiment will now be described with reference to FIG. 2, which is a schematic block diagram of the license issuance apparatus 102 and each content playback apparatus 104.

The license issuance apparatus 102 and the content playback apparatus 104 are information processing apparatuses that have a function for processing information, such as a license, according to this embodiment. The information processing apparatus includes a host computer, a personal computer (PC), or a portable terminal such as a Personal Digital Assistant (PDA). The license issuance apparatus 102 is preferably realized by a host computer or a personal computer (PC). On the other hand, the content playback apparatus 104 is preferably realized by a personal computer (PC); a portable terminal, such as a Personal Digital Assistant (PDA) and a mobile phone; or an information household appliance, such as an audio device that can play back music content, or a television set or a video recorder that can play back video content.

Figure 2:
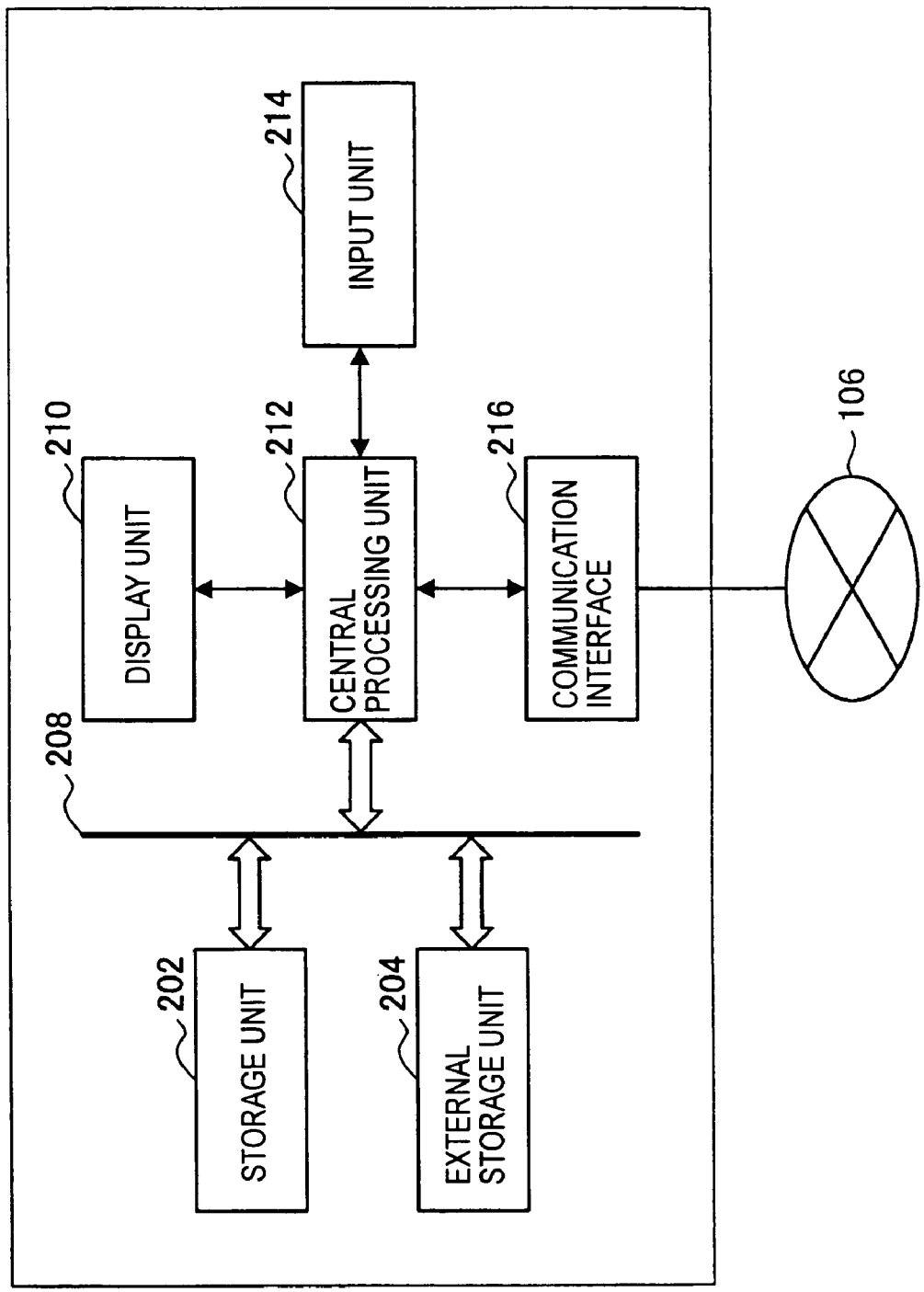
FIG. 2 is a schematic block diagram of a license issuance apparatus and a content playback apparatus according to an embodiment of the present invention.

As shown in FIG. 2, each of the license issuance apparatus 102 and the content playback apparatus 104 includes a storage unit 202, an external storage unit 204, a system bus 208, a display unit 210, a Central Processing Unit 212, an input unit 214, a communication interface 216, etc.

The storage unit 202 stores a computer program for enabling the information processing apparatus, which may be a computer, to function as the license issuance apparatus 102 or the content playback apparatus 104 according to this embodiment. The storage unit 202 can also store other various types of information such as licenses and reference date/time information.

The external storage unit 204 is an external storage medium which is realized by, for example, a magnetic disk, such as a Floppy® Disk and a compact disk; a magneto-optical disk such as an MO; or a flash-memory recording medium. Information, such as a license, stored in the external storage unit 204 is always available, and hence can be issued or acquired via the external storage unit 204 even in an environment where the license issuance apparatus 102 and the content playback apparatus 104 are not connected to the communication network 106. When information, such as a license, is to be transmitted/received via the communication network 106, the external storage unit 204 may be removed.

The system bus 208 is a transmission pathway for interchanging data among the Central Processing Unit 212, the storage unit 202, and the external storage unit 204. The display unit 210 is realized by, for example, a Liquid Crystal Display (LCD) for displaying digital content including text content, such as books, and video content, such as moving images and static images. The input unit 214 has a function for allowing a user to enter information, and is realized by, for example, a keyboard, a mouse, and a touch screen.

The communication interface 216 has a function for transmitting/receiving information, such as a license, according to the embodiment via the communication network 106. According to this embodiment, a license can be issued and acquired via the external storage unit 204, in which case, the communication interface 216 is not necessary.

The Central Processing Unit 212 controls the entire information processing apparatus including the above-described units and the communication interface 216.

License Issuance Apparatus

The structure of the license issuance apparatus 102 according to this embodiment will now be described in detail with reference to FIG. 3, which is a block diagram showing the structure of the license issuance apparatus 102.

Figure 3:
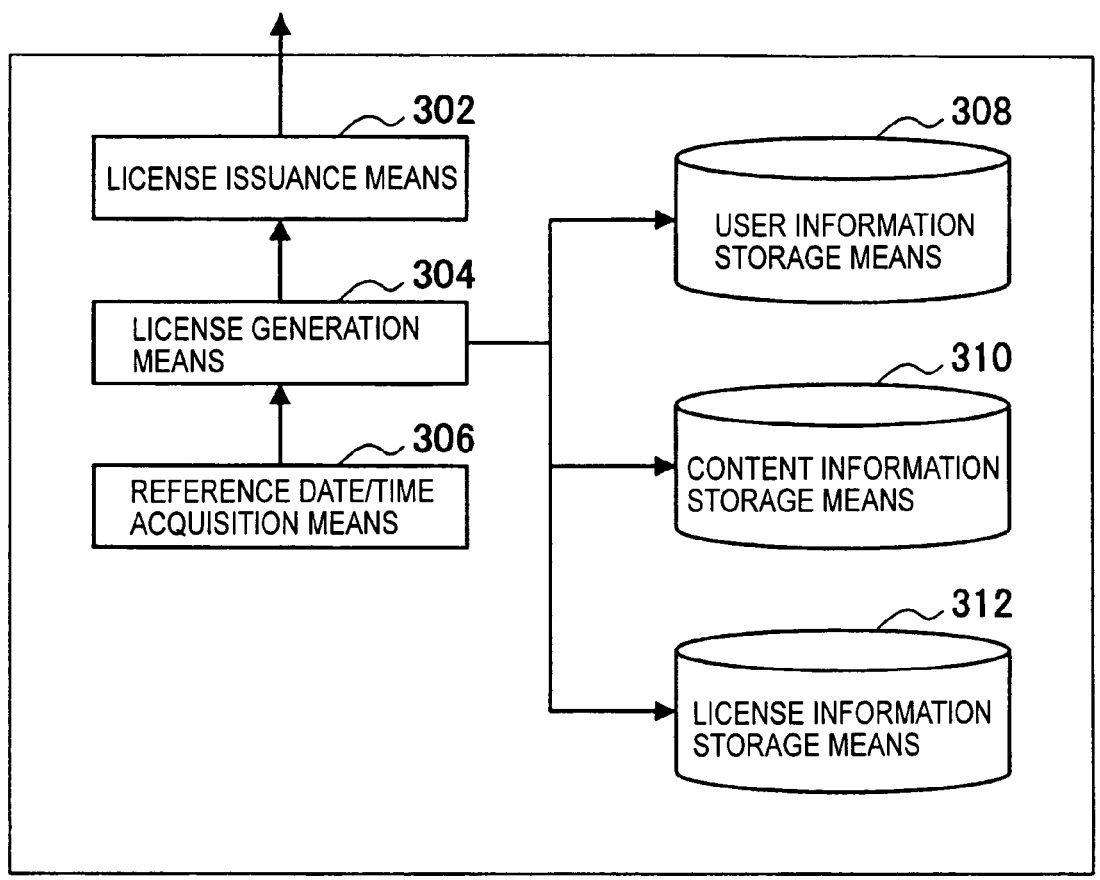
FIG. 3 is a block diagram showing the structure of a license issuance apparatus according to an embodiment of the present invention.

As shown in FIG. 3, the license issuance apparatus 102 includes license issuance means 302, license generation means 304, reference date/time acquisition means 306, user information storage means 308, content information storage means 310, license information storage means 312, etc.

The license issuance means 302 has a function for issuing a license generated by the license generation means 304. More specifically, when the license issuance apparatus 102 is connected to the communication network 106, the license issuance apparatus 102 can transmit a license to, for example, the content playback apparatus 104 via the communication network 106. Furthermore, when the license issuance apparatus 102 is not connected to the communication network 106, the license issuance apparatus 102 can store the license in the external storage medium.

Figure 6A:
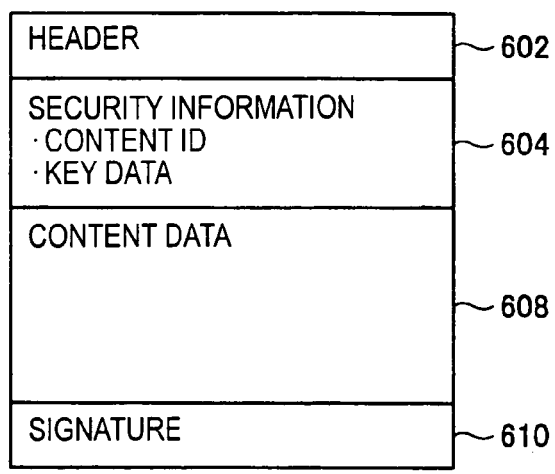
FIG. 6A is an illustration of the data structure of digital content according to an embodiment of the present invention.

The license generation means 304 generates a license for restricting the use of digital content. Example structures of digital content and a license according to this embodiment will now be described with reference to FIGS. 6A and 6B. FIG. 6A shows one example of the data structure of digital content, and FIG. 6B shows one example of the data structure of a license corresponding to the digital content.

As shown in FIG. 6A, digital content according to this embodiment includes a header 602, security information 604, content data 608, a signature 610, etc. The header 602 contains, for example, the version information of the digital content. The security information 604 contains, for example, a content ID and key data. The content ID is one example of content identification information for uniquely identifying the digital content, which is linked with the license by means of the content ID. The key data is, for example, data for decrypting the encrypted content data 608.

The content data 608 contains the main information of the digital content, such as text data, image data, music data, and video data. It is preferable that the content data 608 be encrypted. The signature 610 is a digital signature for the content data 608, and is used to verify that the content data 608 has not been altered. The data structure of digital content is not limited to the above-described example, and, according to this embodiment, the digital content may contain, for example, information related to the available time included in the license. It is sufficient to contain at least the content data 608 and the content ID that allows the digital content to be uniquely identified and to be linked with the license.

Figure 6B:
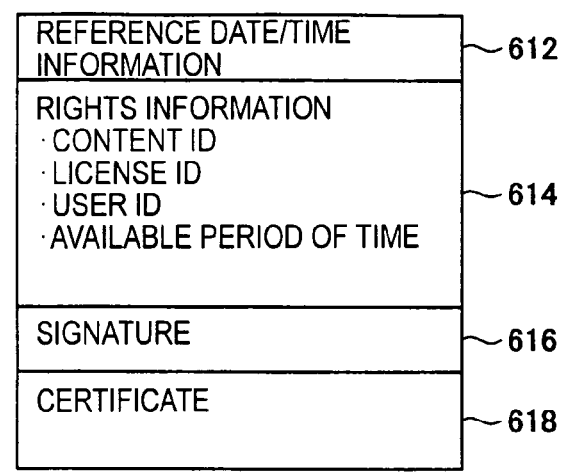
FIG. 6B is an illustration of the data structure of a license according to an embodiment of the present invention.

As shown in FIG. 6B, a license according to this embodiment includes reference date/time information 612, rights information 614, a signature 616, a certificate 618, etc. The reference date/time information 612 contains date/time information that functions as a criterion for determining whether or not the system date/time of the content playback apparatus 104 is valid when the digital content in the content playback apparatus 104 is to be used. More specifically, the reference date/time information 612 is, for example, the system date/time of the license issuance apparatus 102 when the license issuance apparatus 102 generates or issues a license, or any date/time a predetermined period of time before or after such a system date/time. Alternatively, the reference date/time information 612 may be acquired from, for example, a reliable external server and stored when the license issuance apparatus 102 generates or issues a license.

The rights information 614 contains, for example, a content ID, a license ID, a user ID, an available time, etc. The content ID is one example of content identification information for uniquely identifying the digital content. In short, the content ID identifies the digital content whose usage is restricted with the license. The content ID links the license with the corresponding digital content. The license ID is information for uniquely identifying the license, and is assigned, for example, when the license issuance apparatus 102 generates the license.

The user ID is information for identifying the user to whom the license has been issued, i.e., the user who has been permitted to use the digital content corresponding to the license. For example, when a pre-registered user is to receive a digital content service, a user registration operation for the service causes the user to be granted a user ID for uniquely identifying the user. The user ID stored in the license is used, for example, to prevent digital content from being used illegally by asking for the user ID to be entered when the digital content is to be played back. Alternatively, each content playback apparatus 104 may be granted a client ID for uniquely identifying the content playback apparatus 104 at the time of registration for a service, and the client ID may be bound with the content playback apparatus 104 to prevent another content playback apparatus 104 from using the digital content.

The available time is information for defining the period of time within which the digital content corresponding to the license can be used. Such information contained in the license enables, for example, the content playback apparatus 104 to perform processing for allowing the digital content to be played back within the available time only. The rights information 614 may additionally contain other information such as the number of times the digital content is used and access rights to the digital content.

The signature 616 is a digital signature for the license, and can be used to verify that the license has not been altered. The certificate 618 is a digital certificate for certifying the generator of the license via a certificate authority, and can be used to verify the validity of the license.

One example of a procedure for playing back digital content in the content playback apparatus 104 by the use of the above-described digital content and license is described below. First, when the user attempts to play back digital content on the content playback apparatus 104, the content playback apparatus 104 searches itself or other accessible locations for a license containing the content ID by using the content ID of the digital content as a search key. If the license is not found, the desired digital content cannot be played back. If a license is found, the license is validated by verifying the certificate 618 and the signature 616 in the license. The content playback apparatus 104 then refers to, for example, the user ID or the client ID, and when the user or the client is permitted to use the digital content, the content playback apparatus 104 verifies the reference date/time information stored therein, validates the system date/time information, and confirms the available time. When a determination is made that the digital content can be used, the content playback apparatus 104 plays back the digital content. The verification of the reference date/time information and the validation of the system date/time information will be described below. The above-described procedure is just one example, and the present invention is not limited to this example. The present invention can be applied to any procedure for managing the playback of digital content by the use of a license.

Example structures of a license and digital content have been described. Referring back to FIG. 3, the description of the structure of the license issuance apparatus 102 is continued. The license generation means 304 refers to, for example, the user information storage means 308 and the content information storage means 310 to generate the above-described license, and records information related to the generated license onto the license information storage means 312. When the license generation means 304 generates a license, the reference date/time acquired by the reference date/time acquisition means 306, to be described below, may be stored in the license as reference date/time information. Alternatively, the reference date/time acquired by the reference date/time acquisition means 306 may be stored in the license as reference date/time information when the license issuance means 302 issues the license. Furthermore, information related to the generated license does not need to be recorded in the license information storage means 312.

The reference date/time acquisition means 306 acquires the system date/time of the license issuance apparatus 102.

Alternatively, the date/time information may be acquired from a reliable external server via, for example, the communication network 106.

The user information storage means 308 contains, for example, information related to the user who is to use the digital content. Information related to a user includes, for example, a user ID, a user name, an address, information for uniquely identifying the content playback apparatus 104 used by the user, etc.

The content information storage means 310 contains information related to the digital content. Information related to digital content includes, for example, a content ID, the type of content, version information, content location information, etc. The digital content may be stored in the license issuance server 102 or in another apparatus such as another server.

The license information storage means 312 will now be described with reference to FIG. 5, which shows one example of the license information storage means 312. The license information storage means 312 contains information related to the license generated by the license generation means 304. As shown in FIG. 5, information related to a license includes, for example, a license ID 502, a content ID 504, a user ID 506, an available time 508, etc.

Content Playback Apparatus

The structure of the content playback apparatus 104 according to this embodiment will now be described in detail with reference to FIG. 4, which is a block diagram showing the structure of the content playback apparatus 104.

Figure 4:
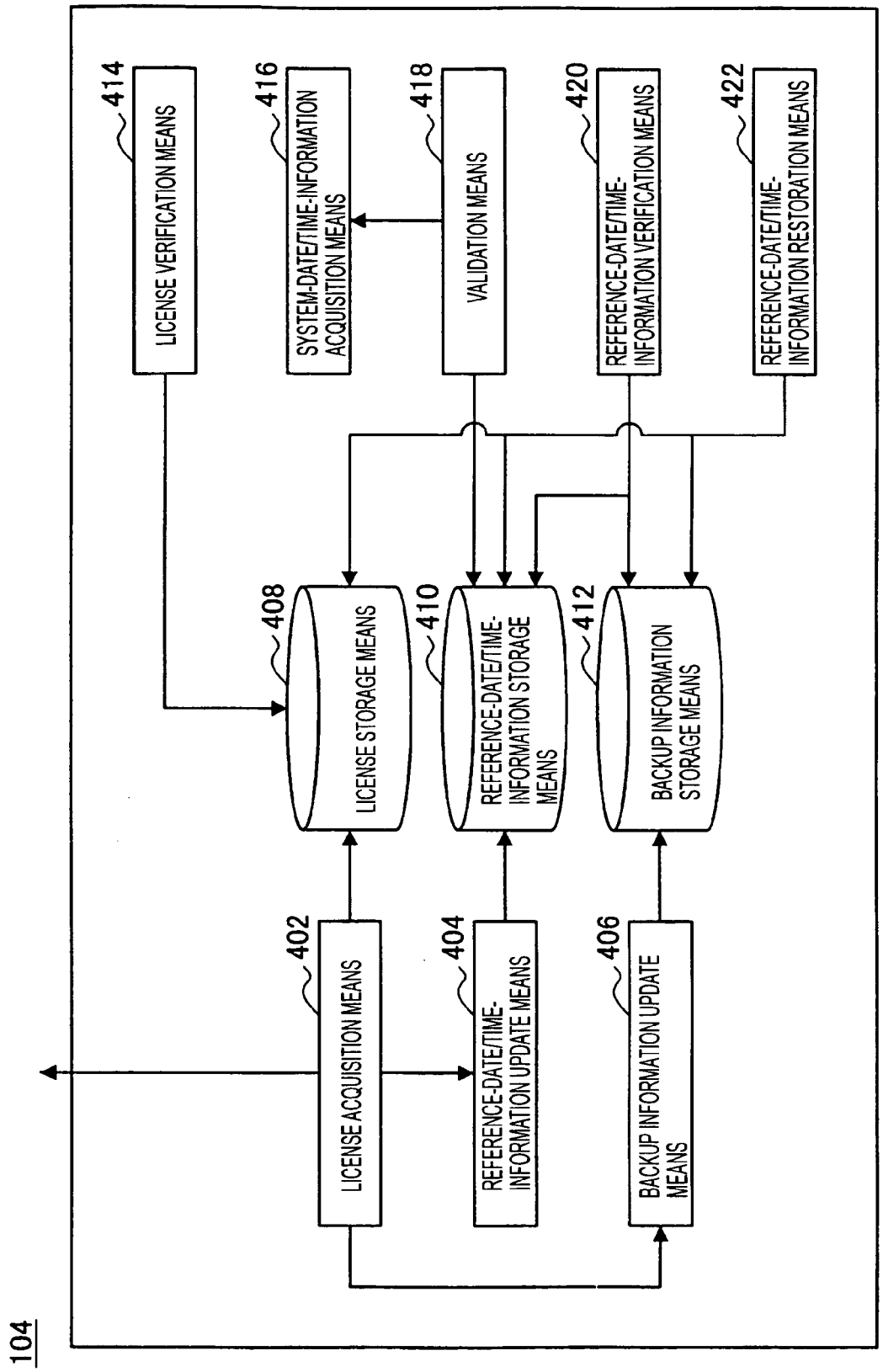
FIG. 4 is a block diagram showing the structure of a content playback apparatus according to an embodiment of the present invention.

As shown in FIG. 4, the content playback apparatus 104 includes license acquisition means 402, reference-date/time-information update means 404, backup information update means 406, license storage means 408, reference-date/time-information storage means 410, backup information storage means 412, license verification means 414, system-date/time-information acquisition means 416, validation means 418, reference-date/time-information verification means 420, reference-date/time-information restoration means 422, etc.

The license acquisition means 402 has a function for acquiring a license issued by the license issuance apparatus 102 and recording the acquired license in the license storage means 408. More specifically, the license acquisition means 402 receives a license from the license issuance apparatus 102 or another personal computer via, for example, the communication network 106, receives a license from another personal computer via a network, such as a LAN, or a connection interface, such as USB, or acquires a license via an external storage medium. The license acquisition means 402 then writes the acquired license in the license storage means 408. On the other hand, the license acquisition means 402 has a function for searching, based on the content ID, the license storage means 408 for the license corresponding to digital content and then acquiring the found license when the user is to play back the digital content in the content playback apparatus 104.

The reference-date/time-information update means 404 has a function for updating the reference-date/time-information storage means 410 in order to maintain the reference date/time information stored in the reference-date/time-information storage means 410 at the latest version. More specifically, for example, when the license acquisition means 402 acquires the reference date/time information included in a license newly acquired from, for example, the license issuance apparatus 102 or the external storage medium and if the acquired reference date/time information is newer than the reference date/time information currently recorded in the reference-date/time-information storage means 410, then the reference-date/time-information storage means 410 is updated with the acquired reference date/time information. Alternatively, when the license acquisition means 402 acquires the license corresponding to digital content from the license storage means 408 for playback of the digital content, the reference-date/time-information update means 404 acquires the reference date/time information from the license. If the acquired reference date/time information is newer than the reference date/time information currently recorded in the reference-date/time-information storage means 410, the reference-date/time-information storage means 410 is updated with the acquired reference date/time information. As described above, updating may typically be carried out when a new license is acquired or when digital content is to be played back. When to carry out updating, however, is not limited to these two cases, but updating may be carried out at any time, such as at predetermined time intervals, as long as the reference date/time information recorded in the reference-date/time-information storage means 410 is maintained at the latest version. This embodiment assumes that updating is carried out when digital content is to be played back.

The backup information update means 406 has a function for updating the backup information storage means 412 in order to maintain the reference date/time information stored in the backup information storage means 412 at the latest version. More specifically, for example, when the license acquisition means 402 acquires the reference date/time information included in a license newly acquired from, for example, the license issuance apparatus 102 or the external storage medium and if the acquired reference date/time information is newer than the reference date/time information currently recorded in the backup information storage means 412, then the backup information storage means 412 is updated with the acquired reference date/time information. Alternatively, when the license acquisition means 402 acquires the license corresponding to digital content from the license storage means 408 for playback of the digital content, the backup information update means 406 acquires the reference date/time information from the license. If the acquired reference date/time information is newer than the reference date/time information currently recorded in the backup information storage means 412, the backup information storage means 412 is updated with the acquired reference date/time information. As described above, updating may typically be carried out when a new license is acquired or when digital content is to be played back. When to carry out updating, however, is not limited to these two cases, but updating may be carried out at any time, such as at predetermined time intervals, as long as the reference date/time information recorded in the backup information storage means 412 is maintained at the latest version. This embodiment assumes that updating is carried out when digital content is to be played back.

The license storage means 408 has a function for storing a license. More specifically, licenses issued by the license issuance apparatus 102 and acquired by the license acquisition means 402 are stored. A license has already been described with reference to FIG. 6B.

The reference-date/time-information storage means 410 has a function for storing the reference date/time information included in the license. More specifically, the reference date/time information in a license issued by the issuance apparatus 102 and acquired by the license acquisition means 402 is stored. As described above, according to this embodiment, the reference-date/time-information update means 404 acquires the reference date/time information in the license corresponding to digital content for playback of the digital content, compares the acquired reference date/time information with the reference date/time information currently stored in the reference-date/time-information storage means 410, and updates the reference-date/time-information storage means 410 if the reference date/time information acquired from the license is newer. The initial value of the reference date/time information may be, for example, the reference date/time information that is transmitted to the user by the license issuance apparatus 102 together with the user ID and then stored in the reference-date/time-information storage means 410 when the user has attempted to perform user registration to use a digital content provision service.

The backup information storage means 412 has a function for storing the reference date/time information. More specifically, the reference date/time information in a license issued by the license issuance apparatus 102 and acquired by the license acquisition means 402 is stored. As described above, according to this embodiment, the backup information update means 406 acquires the reference date/time information in the license corresponding to digital content for playback of the digital content, compares the acquired reference date/time information with the reference date/time information currently stored in the backup information storage means 412, and updates the backup information storage means 412 if the reference date/time information acquired from the license is newer. The initial value of the reference date/time information may be, for example, the reference date/time information that is transmitted to the user by the license issuance apparatus 102 together with the user ID and then stored in the reference-date/time-information storage means 410 and the backup information storage means 412 when the user has attempted to perform user registration to use a digital content provision service.

Figure 7A:
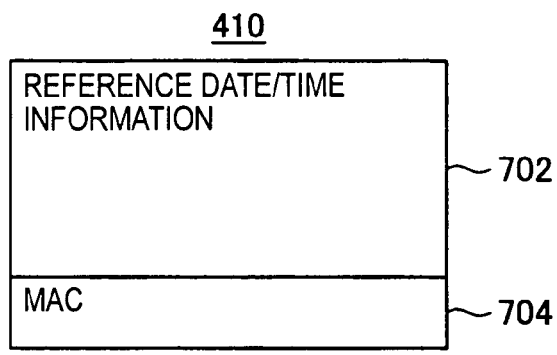
FIG. 7A is an illustration of the data structure of reference-date/time-information storage means according to an embodiment of the present invention.

The structures of the reference-date/time-information storage means 410 and the backup information storage means 412 will now be described with reference to FIGS. 7A and 7B. FIG. 7A shows an example data structure of the reference-date/time-information storage means 410, and FIG. 7B shows an example data structure of the backup information storage means 412.

As shown in FIG. 7A, the reference-date/time-information storage means 410 includes reference date/time information 702, a Message Authentication Code (hereinafter, referred to as a MAC) 704, etc. The MAC 704 is one example of information for uniquely identifying the stored reference date/time information 702, and is used to check whether or not the reference date/time information 702 has been altered based on a hash value derived from the reference date/time information 702, a password, etc. Information for uniquely identifying the reference date/time information 702 is not limited to the MAC 704, but any information that can be used to check whether or not the reference date/time information 702 has been altered, such as a digital signature, is acceptable. Furthermore, when the reference date/time information 702 is ruled out from any chance of alteration by, for example, setting access rights to the reference-date/time-information storage means 410, information for uniquely identifying the reference date/time information 702 does not need to be added.

Figure 7B:
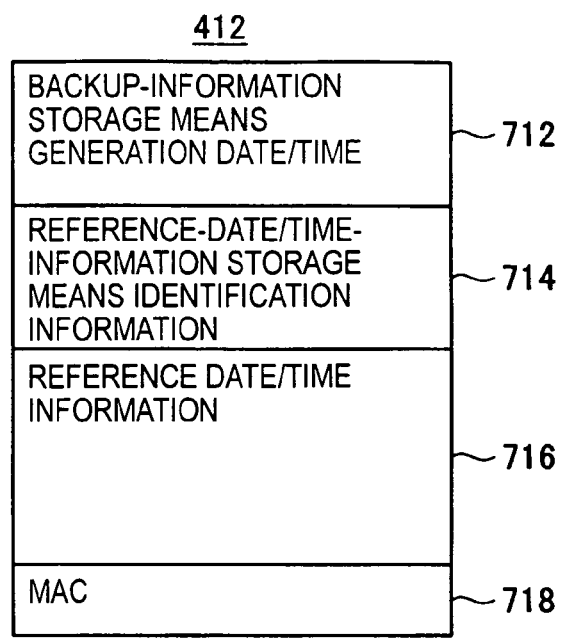
FIG. 7B is an illustration of the data structure of the backup information storage means according to an embodiment of the present invention.

As shown in FIG. 7B, the backup information storage means 412 includes a backup-information-storage-means generation date/time 712, reference-date/time-information storage means identification information 714, reference date/time information 716, a MAC 718, etc. The backup-information-storage-means generation date/time 712 is a generation date/time added by the operating system (hereinafter, referred to as the OS), for example, when the backup information storage means 412 is generated. Storing the generation date/time 712 enables the validity of the backup information storage means 412 to be verified by comparing the current generation date/time of the backup information storage means 412 with the stored generation date/time 712. The backup-information-storage-means generation date/time 712 is just an example, and any information that can be used to verify the validity of the backup information storage means 412 is acceptable. Furthermore, when the backup information storage means 412 is ruled out from any chance of illegal operation by, for example, setting access rights to the backup information storage means 412, information for verifying the validity does not need to be added.

The reference-date/time-information storage means identification information 714 is one example of information for uniquely identifying the reference-date/time-information storage means 410, and is used to verify the validity of the reference-date/time-information storage means 410 by storing the identification information 714. The reference-date/time-information storage means identification information 714 is just an example, and any information that can be used to verify the validity of the reference-date/time-information storage means 410 is acceptable. Furthermore, when the reference-date/time-information storage means 410 is ruled out from any chance of illegal operation by, for example, setting access rights to the reference-date/time-information storage means 410, information for verifying the validity does not need to be added.

The reference date/time information 716 is basically the same as the reference date/time information 702 stored in the reference-date/time-information storage means 410, but may be different if the reference date/time information 702 or the reference date/time information 716 is altered. The reference date/time information 716 is used to restore the reference date/time information 702 when the reference date/time information 702 becomes unreliable due to, for example, illegal operations on or destruction of the reference-date/time-information storage means 410 or alteration to the reference date/time information 702. The MAC 718 is information used to verify that there is no alteration in the backup-information-storage-means generation date/time 712, the reference-date/time-information storage means identification information 714, and the reference date/time information 716.

The structures of the reference-date/time-information storage means 410 and the backup information storage means 412 have been described. Referring back to FIG. 4, the description of the structure of the content playback apparatus 104 is continued. The license verification means 414 has a function for verifying the validity of the license. More specifically, for example, when digital content is to be played back, the license corresponding to the digital content is checked for alteration or the validity of the issuer is verified by the use of, for example, the signature 616 and the certificate 618 included in the license.

The system-date/time-information acquisition means 416 has a function for acquiring the system date/time information of the content playback apparatus 104. The current date/time is acquired from the internal clock of the content playback apparatus 104.

The validation means 418 has a function for comparing the system date/time information with the reference date/time information to validate the system date/time information. More specifically, for example, when digital content is to be played back, the system date/time information of the content playback apparatus 104 acquired by the system-date/time-information acquisition means 416 is compared with the reference date/time information 702 stored in the reference-date/time-information storage means 410, and when the system date/time information is earlier than the date/time of the reference date/time information 702, a determination is made that the system date/time has been rolled back, i.e., that the system date/time is not valid. In this case, any criterion for validation can be set. For example, a determination is made that the system date/time is not valid if the system date/time information is earlier than the reference date/time information 702 by a predetermined period of time or by a predetermined number of days.

The reference-date/time-information verification means 420 has a function for verifying the validity of the reference date/time information. More specifically, it is verified by the use of, for example, information stored in the backup information storage means 412 whether or not the reference date/time information 702 stored in the reference-date/time-information storage means 410 is reliable, valid, and free of, for example, alteration. The verification procedure will be described later.

The reference-date/time-information restoration means 422 has a function for restoring the reference-date/time-information storage means 410 if the reference-date/time-information storage means 410 is invalid. More specifically, if the reference-date/time-information storage means 410 is placed in an invalid status where the reference-date/time-information storage means 410 is not reliable any more, due to, for example, an illegal operation such as an alteration or the occurrence of a failure, the information stored in the backup information storage means 412, the license stored in the license storage means 408, etc. are used to restore the reference-date/time-information storage means 410. The restoration procedure will be described later.

User Registration Processing

Figure 8:
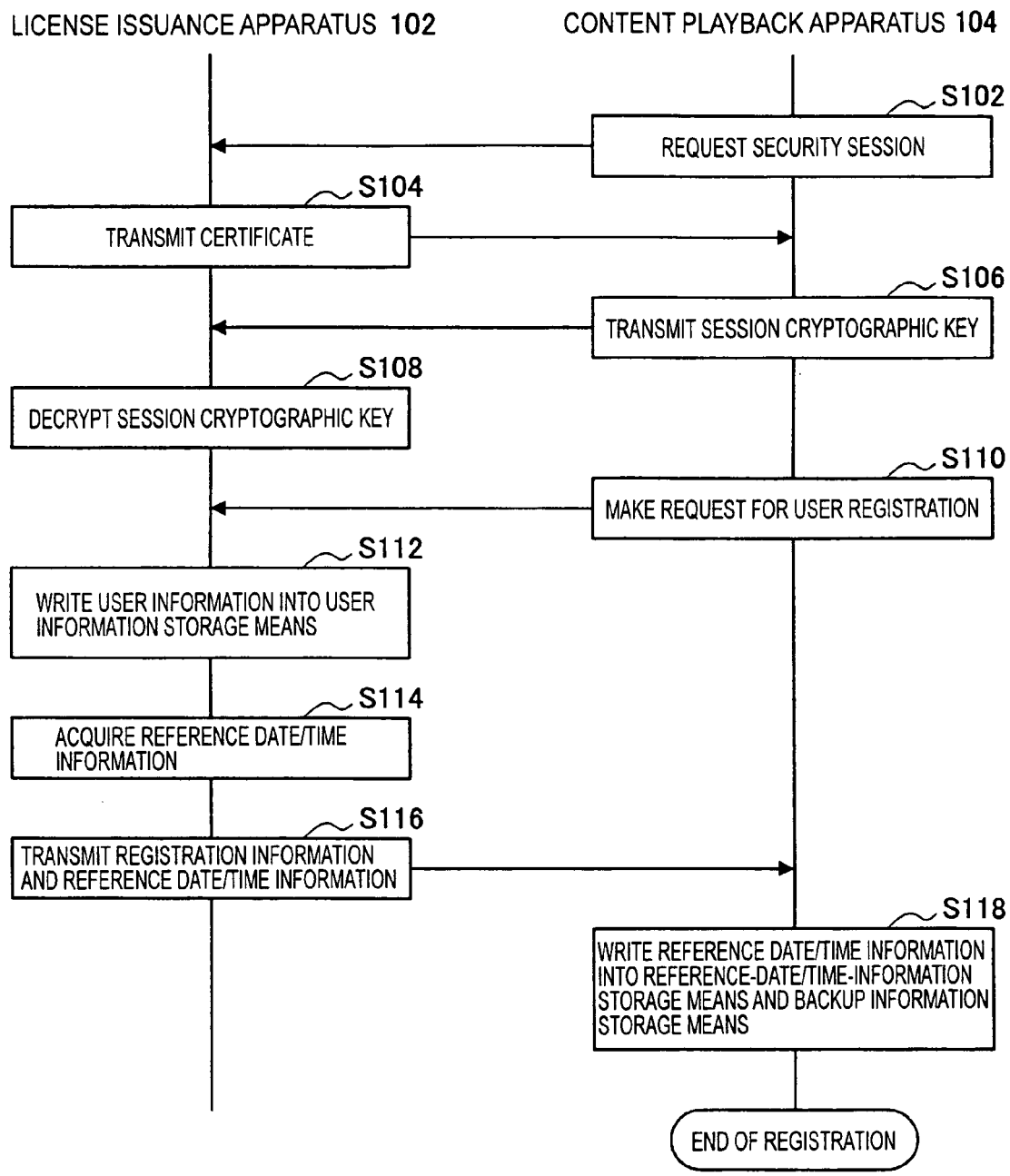
FIG. 8 is a flowchart showing the flow of user registration processing according to an embodiment of the present invention.

User registration processing in the content use management system 100 according to this embodiment will now be described with reference to FIG. 8, which is a flowchart showing the flow of user registration processing in the content use management system 100.

In step S102, the first step, the user connects from the content playback apparatus 104 to the license issuance apparatus 102 via the communication network 106 and makes a request for a security session for secure transmission/reception of information. In step S104, the license issuance apparatus 102 transmits a certificate to the content playback apparatus 104 to certify its validity. In step S106, the content playback apparatus 104 that has received the certificate checks the validity of the certificate and then transmits a session cryptographic key. The license issuance apparatus 102 decrypts the received session cryptographic key in step S108 to use this session key for the subsequent communication. The use of the session key ensures secure communication.

In step S110, the user transmits a user registration request to the license issuance apparatus 102 from the content playback apparatus 104. For example, a user name, an address, and a telephone number are transmitted as user information to make a request for user registration. In step S112, the license issuance apparatus 102 stores the received user information in the user information storage means 308. The reference date/time information, such as the system date/time of the license issuance apparatus 102, is then acquired in step S114, and the registration information, such as the user ID, and the reference date/time information are transmitted to the content playback apparatus 104 in step S116.

After the content playback apparatus 104 has received the registration information and the reference date/time information, the content playback apparatus 104 stores the reference date/time information in the reference-date/time-information storage means 410 and the backup information storage means 412 in step S118 to complete the user registration. The content playback apparatus 104 may store the reference date/time information after the content playback apparatus 104 has generated new reference-date/time-information storage means 410 and backup information storage means 412. The license issuance apparatus 102 may transmit, for example, a computer program for enabling a computer to function as the content playback apparatus 104 along with the registration information and the reference date/time information. The user may make a user registration request using an information processing apparatus other than the content playback apparatus 104, as long as the information processing apparatus is connectable to the license issuance apparatus 102 via the communication network 106.

License Issuance Processing

Figure 9:
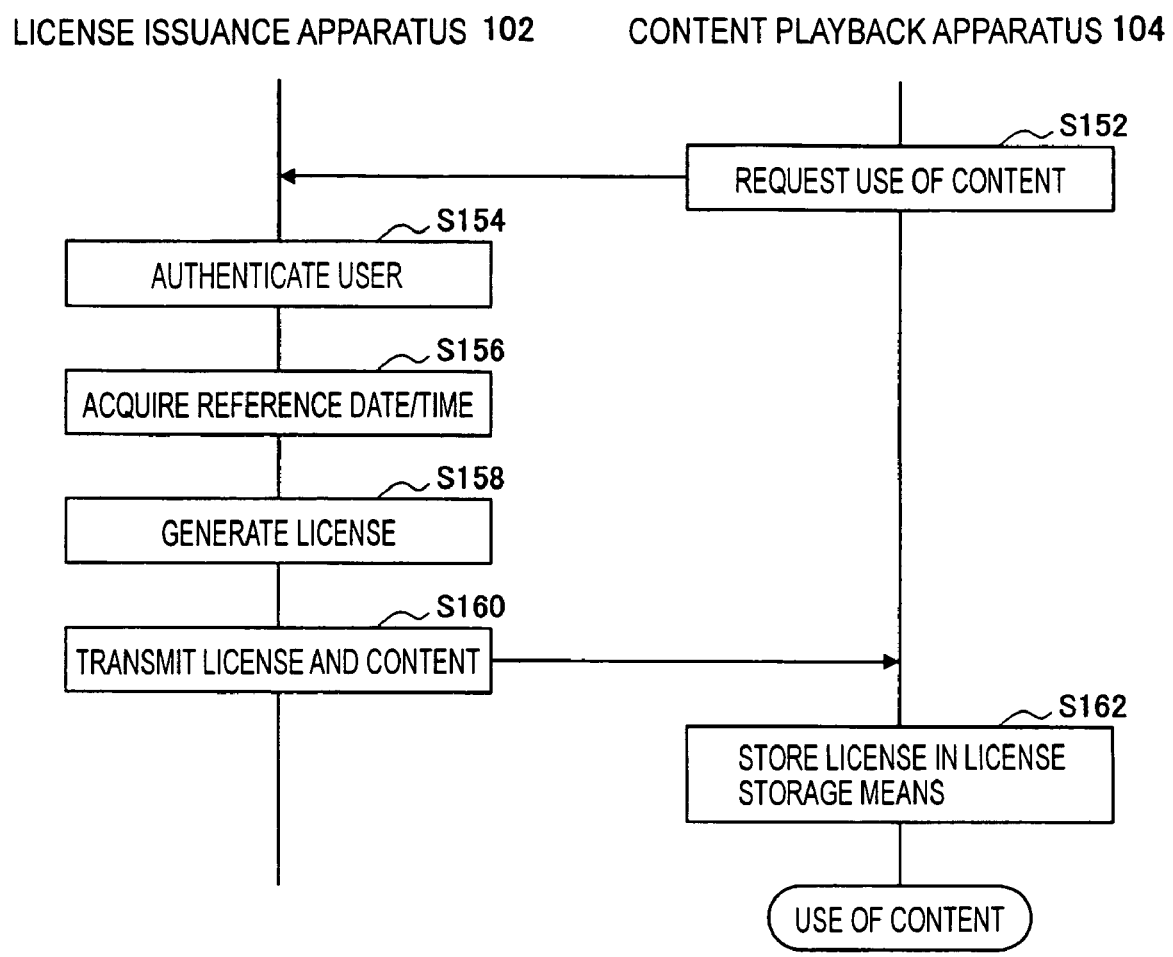
FIG. 9 is a flowchart showing the flow of license issuance processing according to an embodiment of the present invention.

One example of license issuance processing in the content use management system 100 according to this embodiment will now be described with reference to FIG. 9, which is a flowchart showing the flow of license issuance processing in the content use management system 100.

In step S152, the first step, on the content playback apparatus 104, the user makes a request to the license issuance apparatus 102 via the communication network 106 for the use of digital content. The license issuance apparatus 102 performs user authentication with, for example, a password in step S154 to confirm that the user is a registered user, and in step S156 acquires the reference date/time information. A license including the reference date/time information is then generated in step S158, and the license is transmitted to the content playback apparatus 104 in step S160. If the license issuance apparatus 102 also serves as a manager of digital content, the digital content may be transmitted along with the license. In step S162, the content playback apparatus 104 stores the received license in the license storage means 408. Subsequently, the digital content corresponding to the license can be used.

Although, in the above-described example, the license issuance apparatus 102 issues a license to the content playback apparatus 104 via the communication network 106, the present invention is not limited to this example. A license may be transmitted recorded on an external storage medium, or may be transmitted to an information processing apparatus other than the content playback apparatus 104. Furthermore, after the content playback apparatus 104 has acquired the license, the content playback apparatus 104 may store the reference date/time information of the license in the reference-date/time-information storage means 410 and the backup information storage means 412.

Reference Date/time Information Update Processing

Figure 10:
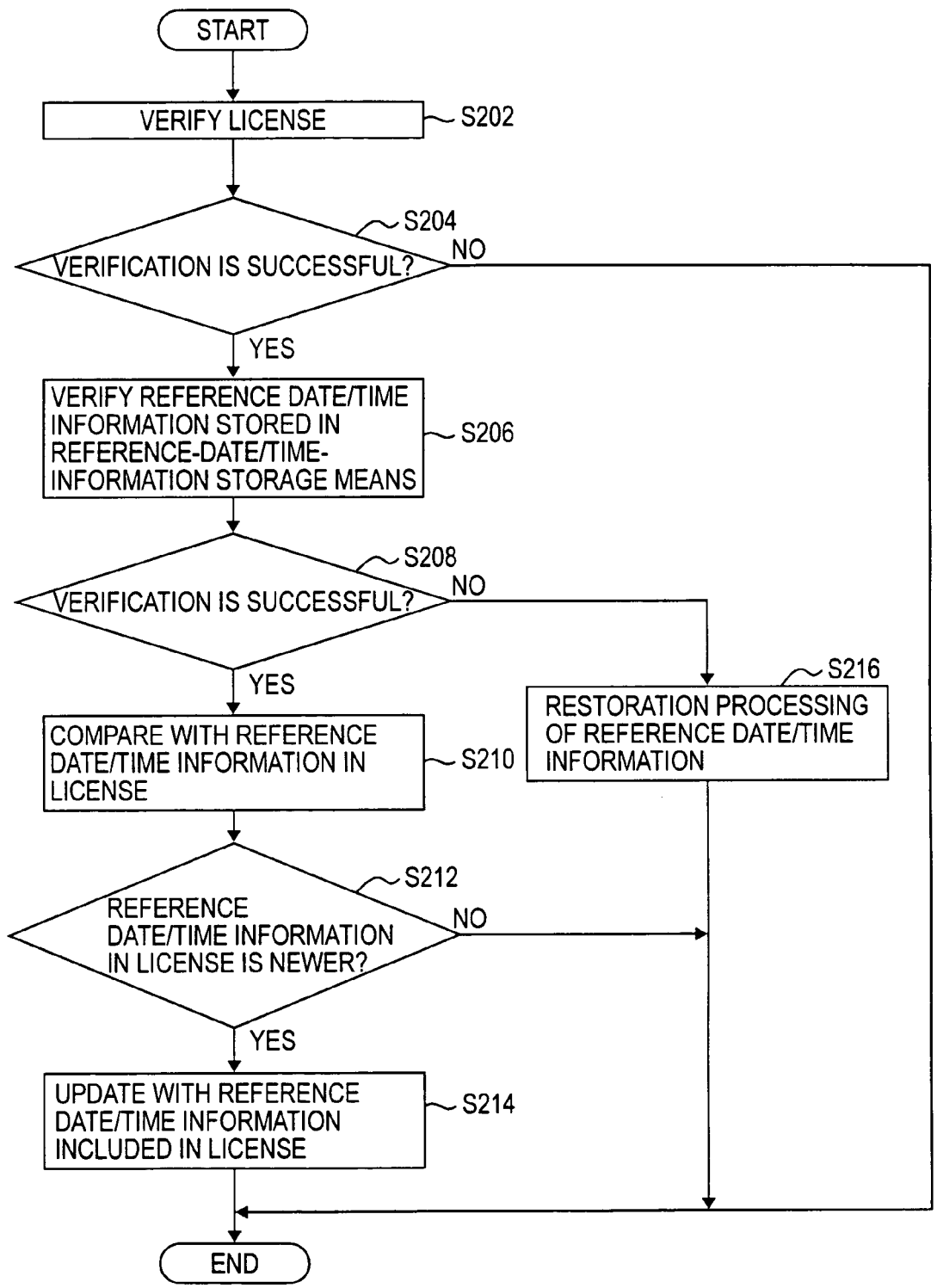
FIG. 10 is a flowchart showing the flow of reference date/time information update processing according to an embodiment of the present invention.

Reference date/time information update processing in the content playback apparatus 104 according to this embodiment will now be described with reference to FIG. 10, which is a flowchart showing the flow of reference date/time information update processing in the content playback apparatus 104.

In step S202, the first step, when the user attempts to play back digital content, a search is made for the license corresponding to the digital content in, for example, the license storage means 408. When the license is found, the license is verified. If the verification is successful in step S204, that is, if the license is validated, the reference date/time information 702 stored in the reference-date/time-information storage means 410 is verified in step S206. Verification processing of the reference date/time information will be described below. If the verification of the reference date/time information 702 is successful in step S208, that is, if the reference date/time information 702 is validated, in step S210 the validated reference date/time information 702 is compared with the reference date/time information 612 included in the license which has been verified in step S202 and which corresponds to the digital content whose playback was attempted. If, in step S212, the reference date/time information 612 included in the license is newer, that is, later than the reference date/time information 702 currently stored in the reference-date/time-information storage means 410, then in step S214 the reference-date/time-information storage means 410 is overwritten with the reference date/time information 612 included in the license.

On the other hand, if the verification of the reference date/time information 702 is not successful in step S208, that is, if the reference date/time information 702 is not reliable or if it has been destroyed, the reference date/time information 702 is subjected to restoration processing in step S216. Restoration processing of the reference date/time information will be described below.

Furthermore, if, in step S212, the reference date/time information 612 included in the license is older, that is, earlier than the reference date/time information 702 currently stored in the reference-date/time-information storage means 410, then the reference-date/time-information storage means 410 is not updated.

Verification Processing of Reference Date/time Information

Figure 11:
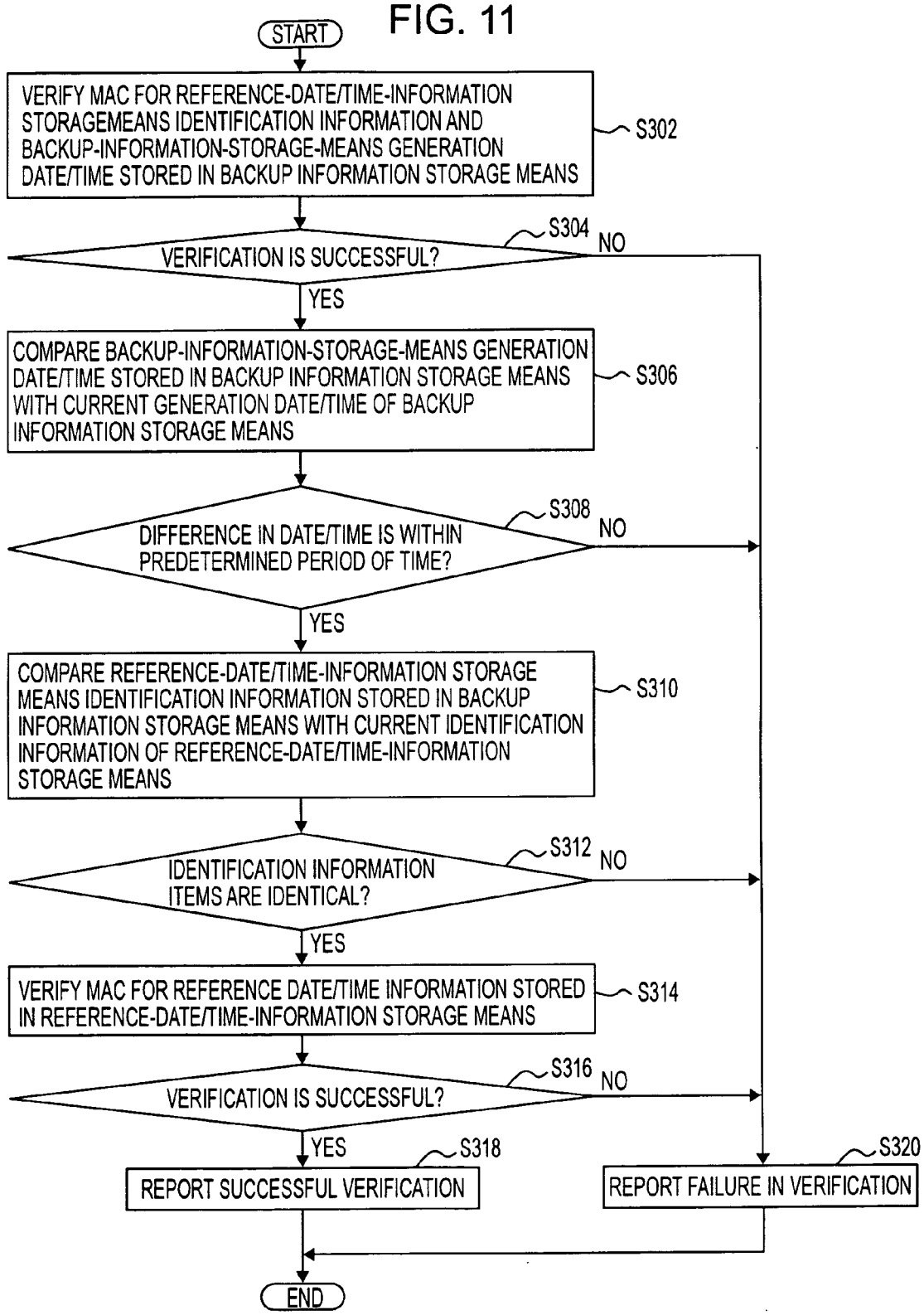
FIG. 11 is a flowchart showing the flow of verification processing of the reference date/time information according to an embodiment of the present invention.

Verification processing of the reference date/time information in the content playback apparatus 104 according to the this embodiment will now be described with reference to FIG. 11, which is a flowchart showing the flow of verification processing of the reference date/time information in the content playback apparatus 104.

In order to verify the validity of the reference date/time information, the reference-date/time-information storage means 410 needs to be validated first. The reference-date/time-information storage means 410 is validated in steps from S302 to S312. In step S302, the first step, the MAC 718 for the backup-information-storage-means generation date/time 712 and the reference-date/time-information storage means identification information 714 included in the backup information storage means 412 is verified. The verification of the MAC 718 makes it possible to check whether or not the backup-information-storage-means generation date/time 712 and the reference-date/time-information storage means identification information 714 have been altered. If the verification is successful in step S304, that is, if it is verified that no alteration has been made, the backup-information-storage-means generation date/time 712 is compared with the current generation date/time of the backup information storage means 412 in step S306. When the difference between the generation date/time items is within a predetermined time in step S308, that is, when the backup information storage means 412 is validated, the flow proceeds to step S310.

In step S310, the stored reference-date/time-information storage means identification information 714 is compared with the current identification information of the reference-date/time-information storage means 410. If the comparison result indicates in step S312 that the identification information items are the same, the reference-date/time-information storage means 410 is validated. The MAC 704 for the reference date/time information 702 stored in the reference-date/time-information storage means 410 is then verified in step S314. If the verification is successful in step 316, that is, if it is verified that the reference date/time information 702 has not been altered, successful validation of the reference date/time information 702 stored in the reference-date/time-information storage means 410 is reported in step S318. The reporting of the successful validation in step S318 is optional.

On the other hand, if the verification fails in step S304, S308, S312, or S316, the reference date/time information 702 stored in the reference-date/time-information storage means 410 is not validated, which means that the reference date/time information 702 may not be reliable. Thus, the subsequent processing for content playback cannot be performed, and hence the reference date/time information 702 needs to be restored. In step S320, a failure in the verification may be reported.

Restoration Processing of Reference Date/time Information

Figure 12:
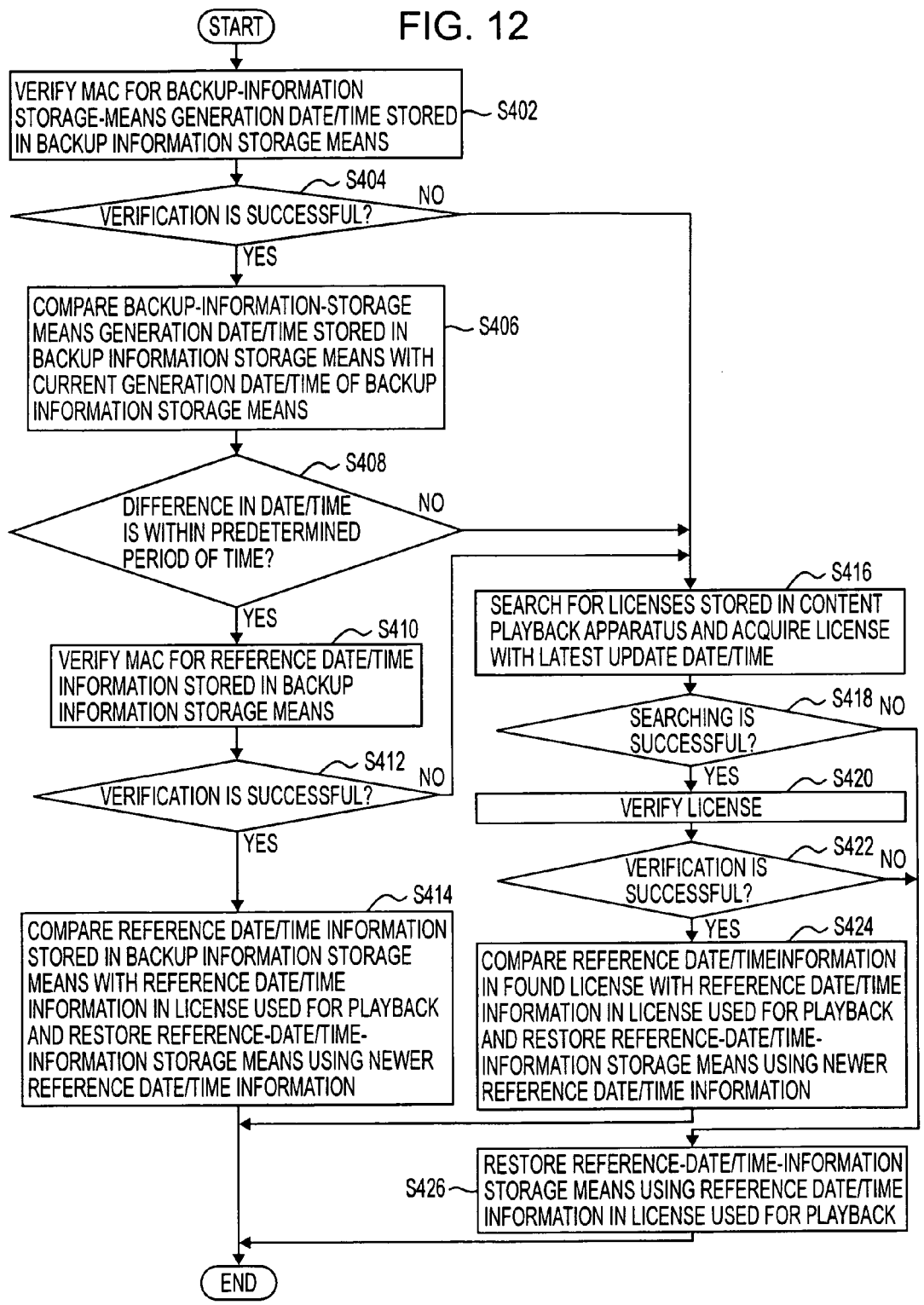
FIG. 12 is a flowchart showing the flow of restoration processing of the reference date/time information according to an embodiment of the present invention.

Restoration processing of the reference date/time information in the content playback apparatus 104 according to this embodiment will now be described with reference to FIG. 12, which is a flowchart showing the flow of restoration processing of the reference date/time information in the content playback apparatus 104.

In step S402, the first step, the MAC 718 for the backup-information-storage-means generation date/time 712 included in the backup information storage means 412 is verified. The verification of the MAC 718 allows the backup-information-storage-means generation date/time 712 to be checked for any alteration. If the verification is successful in step S404, that is, if it is confirmed that no alteration has been made, in step S406 the stored backup-information-storage-means generation date/time 712 is compared with the current generation date/time of the backup information storage means 412. If the difference between the generation date/time items is within a predetermined time in step S408, that is, if the backup information storage means 412 is validated, the flow proceeds to step 410.

In step S410, the MAC 718 for the reference date/time information 716 included in the backup information storage means 412 is verified to check whether or not the reference date/time information 716 has been altered. If the verification is successful in step S412, that is, if it is confirmed that the reference date/time information 716 has not been altered, the flow proceeds to step S414. In step S414, the reference date/time information 716 included in the backup information storage means 412 is compared with the reference date/time information 612 included in the license corresponding to digital content whose playback is attempted. As a result, the reference-date/time-information storage means 410 is restored using the newer reference date/time information, i.e., the reference date/time information with a later date/time.

On the other hand, if the verification has failed in step S404, S408, or S412 and therefore, the reference date/time information 716 stored in the backup information storage means 412 is too unreliable to use for restoration, the flow proceeds to step S416.

In step S416, the license with the latest update date/time added by the OS is acquired from among the licenses stored in, for example, the license storage means 408 of the content playback apparatus 104. If a license has been found in step S416, that is, if a license previously acquired is stored in, for example, the license storage means 408, the license is verified in step S420. If the validity of the license is successful in step S422, in step S424 the reference date/time information 612 included in the found license is compared with the reference date/time information 612 included in the license corresponding to the digital content whose playback is attempted. The reference-date/time-information storage means 410 is restored using the newer reference date/time information, i.e., the reference date/time information with a later date/time. According to the above-described processing, the reference date/time information 612 included in the newest license of the licenses currently held in the content playback apparatus 104 can be used to restore the reference-date/time-information storage means 410.

Furthermore, a failure in the search for a license or the verification in step S418 or S422 indicates that there is no reliable license in the content playback apparatus 104, except for the license corresponding to the digital content whose playback is attempted, and thus in step S426 the reference-date/time-information storage means 410 is restored using the reference date/time information 612 included in the license corresponding to the digital content whose playback is attempted.

According to the above-described restoration processing, the reference-date/time-information storage means 410 can be restored even in an environment where the content playback apparatus 104 cannot be connected to the communication network 106.

Validation Processing of System Date/Time

Figure 13:
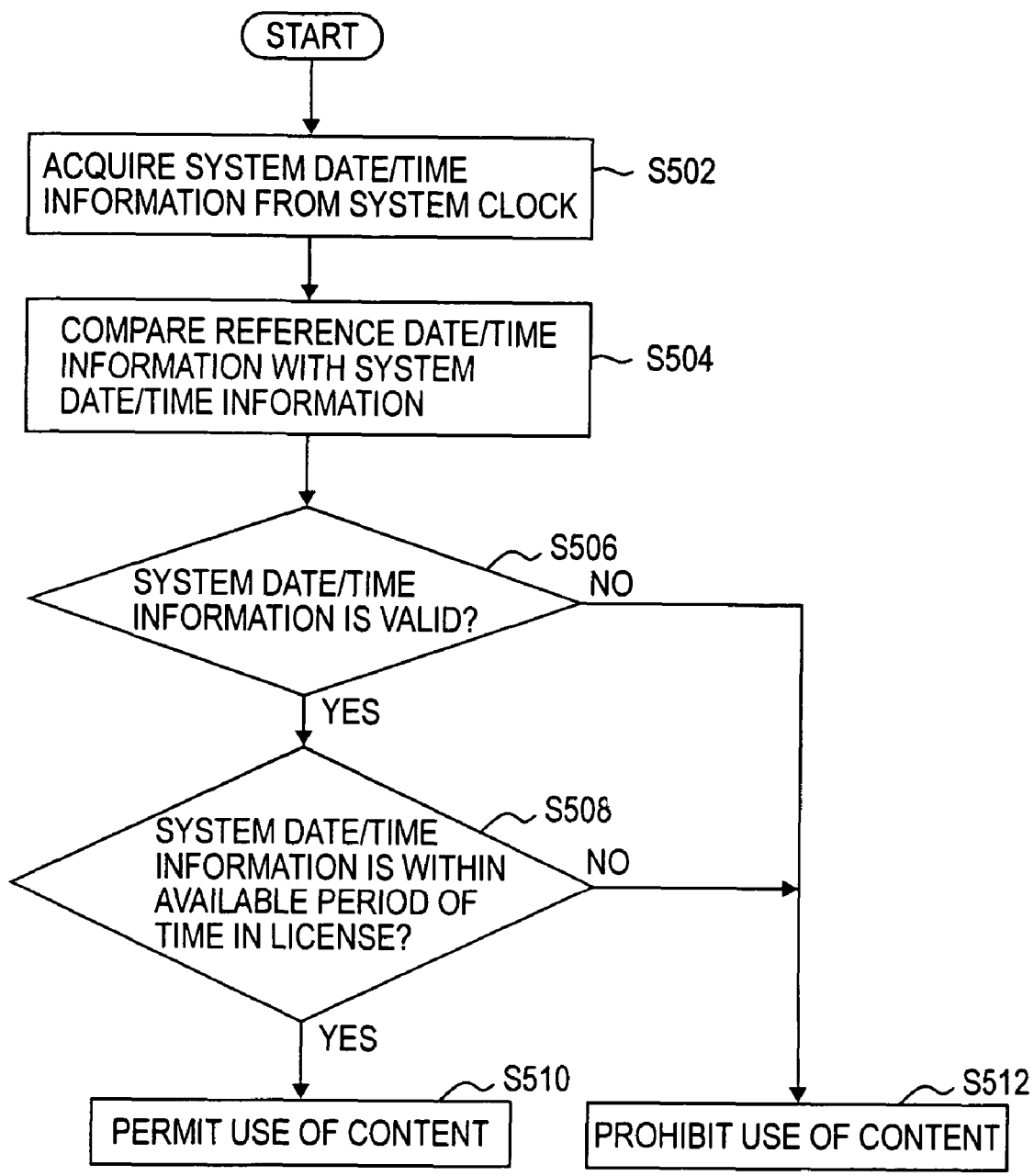
FIG. 13 is a flowchart showing the flow of validation processing of the system date/time according to an embodiment of the present invention.

Validation processing of the system date/time in the content playback apparatus 104 according to this embodiment will now be described with reference to FIG. 13, which is a flowchart showing the flow of validation processing of the system date/time in the content playback apparatus 104.

In step S502, the first step, the system date/time information is acquired by, for example, accessing the internal clock of the content playback apparatus 104. Next in step S504, the reference date/time information whose validity has been confirmed according to, for example, the above-described verification processing of the reference date/time information is compared with the acquired system date/time information. In step S506, if a determination is made that the system date/time information is valid, that is, the system date/time is equal to or later than the reference date/time or the system date/time has not been rolled back, in step S508 the available time included in the license corresponding to the digital content whose playback is attempted is compared with the system date/time. As a result, if the system date/time is within the available time, the use of the digital content is permitted in step S510.

On the other hand, if the system date/time is not valid in step S506, that is, if a determination is made that the system date/time has been rolled back, the use of the digital content is not permitted in step S512. Furthermore, if the system date/time is not within the available time, the use of the digital content is not permitted regardless of whether or not the system date/time is valid.

When a determination is made in step S506 that the system date/time is valid, the reference date/time information 702 included in the reference-date/time-information storage means 410 and the reference date/time information 716 included in the backup information storage means 412 may be updated with the system date/time.

Although the present invention has been described by way of preferred embodiments with reference to the attached drawings, the present invention is not limited to such preferred embodiments. It is apparent to those persons of ordinary skill in the art that various types of modifications and variations are conceivable within the scope of the present invention, and such modifications and variations are also covered by the present invention.

What is claimed is:

1. A content use management system, comprising:
a license issuance apparatus for issuing a license corresponding to digital content, including license generation means for generating the license including at least content identification information for uniquely identifying the digital content, available-period-of-time information for defining a period of time within which the digital content can be used, and reference date/time information; and
license issuance means for issuing the license; and
a content playback apparatus for using the digital content with the license,
including license acquisition means for acquiring the license;
license storage means for storing the license;
reference-date/time-information storage means for storing the reference date/time information;
reference-date/time-information update means for updating the reference date/time information stored in the reference-date/time-information storage means with the reference date/time information included in the license based on whether the reference date/time information included in the license is newer than the reference date/time information stored in the reference-date/time-information storage means;
system-date/time-information acquisition means for acquiring system date/time information in the content playback apparatus;
validation means for determining validity of the system date/time information based on a comparison of the system date/time information with the reference date/time information stored in the reference-date/time-information storage means; and
determination means for determining whether or not the digital content corresponding to the content identification information can be used according to the validity of the system date/time information and the available-period-of-time information.

2. The content use management system according to claim 1, wherein the content playback apparatus includes backup information storage means for storing the reference date/time information and backup information update means for updating the reference date/time information stored in the backup information storage means with the reference date/time information included in the license based on whether the reference date/time information included in the license is newer than the reference date/time information stored in the backup information storage means, and
the content use management system further comprises reference-date/time-information restoration means for restoring, based on a determination that the reference-date/time-information storage means is invalid, the reference date/time information of the reference-date/time-information storage means by using the reference date/time information stored in the backup information storage means.

3. A content playback apparatus for using digital content with a license corresponding to the digital content, comprising:
license acquisition means for acquiring the license including available-period-of-time information for defining a period of time within which the digital content can be used and reference date/time information;
license storage means for storing the license;
reference-date/time-information storage means for storing the reference date/time information;

reference-date/time-information update means for updating the reference date/time information stored in the reference-date/time-information storage means with reference date/time information included in the license based on whether the reference date/time information included in the license is newer than the reference date/time information included in the reference-date/time-information storage means;

system-date/time-information acquisition means for acquiring system date/time information of the content playback apparatus;

validation means for determining validity of the system date/time information based on a comparison of the system date/time information with the reference date/time information stored in the reference-date/time-information storage means; and determination means for determining whether or not the digital content can be used according to the validity of the system date/time information and the available-period-of-time information for determining the period of time within which the digital content can be used.

4. The content playback apparatus according to claim 3, further comprising:

backup information storage means for storing the reference date/time information;

backup information update means for updating the reference date/time information stored in the backup information storage means with the reference date/time information included in the license based on whether the reference date/time information included in the license is newer than the reference date/time information stored in the backup information storage means; and reference-date/time-information restoration means for restoring, based on a determination that the reference-date/time-information storage means is invalid, the reference date/time information of the reference-date/time-information storage means by using the reference date/time information stored in the backup information storage means.

5. The content playback apparatus according to claim 4, wherein the reference-date/time-information restoration means further comprises means for carrying out restoration, based on a determination that the reference-date/time-information storage means and the backup information storage means are invalid, by searching for a latest license from among at least one license stored in the license storage means and using reference date/time information included in the latest license.

6. The content playback apparatus according to claim 4, wherein the backup information storage means stores information for uniquely identifying the reference-date/time-information storage means.

7. The content playback apparatus according to claim 4, wherein at least one of the reference-date/time-information storage means and the backup information storage means further comprises means for storing information for uniquely identifying the stored reference date/time information.

8. A content use management method with a license issuance apparatus for issuing a license corresponding to digital content and a content playback apparatus for using the digital content with the license, the method comprising:

generating in the license issuance apparatus a license including at least content identification information for uniquely identifying the digital content, available-period-of-time information for defining a period of time within which the digital content can be used, and reference date/time information;

issuing the license from the license issuance apparatus;
acquiring the license in the content playback apparatus;
storing the license in a license storage unit of the content playback apparatus;
updating reference date/time information stored in a reference-date/time-information storage unit of the content playback apparatus with the reference date/time information included in the license based on whether the reference date/time information included in the license is newer than the reference date/time information stored in the reference-date/time-information storage unit of the content playback apparatus;
acquiring system date/time information of the content playback apparatus;
determining validity of the system date/time information based on a comparison of the system date/time information with the reference date/time information stored in the reference-date/time-information storage unit; and
determining in the content playback apparatus whether or not the digital content corresponding to the content identification information can be used according to the validity of the system date/time information and the available-period-of-time information.

9. A content playback method by a content playback apparatus for using digital content with a license corresponding to the digital content, the method comprising:

acquiring the license in the content playback apparatus, the license including available-period-of-time information for defining a period of time within which the digital content can be used and reference date/time information;
storing the license in a license storage unit of the content playback apparatus;
updating reference date/time information stored in a reference-date/time-information storage unit of the content playback apparatus with the reference date/time information included in the license based on whether the reference date/time information included in the license is newer than the reference date/time information stored in the reference-date/time-information storage unit of the content playback apparatus;
acquiring system date/time information of the content playback apparatus;
determining validity of the system date/time information based on a comparison of the system date/time information with the reference date/time information stored in the reference-date/time-information storage unit; and
determining in the content playback apparatus whether or not the digital content can be used according to the validity of the system date/time information and the available-period-of-time information for determining the period of time within which the digital content can be used.

10. The content playback method according to claim 9, further comprising:

storing the reference date/time information in a backup information storage unit; and
restoring the reference date/time information of the reference-date/time-information storage unit by using the reference date/time information stored in the backup information storage unit based on a determination that the reference-date/time-information storage unit is invalid.

11. The content playback method according to claim 10, further comprising:

searching for a latest license from among at least one license stored in the license storage unit based on a determination that the reference-date/time-information storage unit and the backup information storage unit are invalid; and carrying out restoration using reference date/time information included in the latest license.

12. The content playback method according to claim 10, further comprising:

storing information for uniquely identifying the reference-date/time-information storage unit in the backup information storage unit; and verifying the validity of the reference-date/time-information storage unit using the information for uniquely identifying the reference-date/time-information storage unit.

13. The content playback method according to claim 10, further comprising:

storing information for uniquely identifying the stored reference date/time information in at least one of the reference-date/time-information storage unit and the backup information storage unit; and verifying the validity of the reference date/time information using the information for uniquely identifying the reference date/time information.

14. A computer-readable storage medium having embedded therein instructions, which when executed by a processor, cause the processor to perform a method for a content playback apparatus for using digital content with a license corresponding to the digital content, the method comprising:

acquiring the license in the content playback apparatus, the license including available-period-of-time information for defining a period of time within which the digital content can be used and reference date/time information;

storing the license in a license storage unit of the content playback apparatus;

updating reference date/time information stored in a reference-date/time-information storage unit of the content playback apparatus with the reference date/time information included in the license based on whether the reference date/time information included in the license is newer than the reference date/time information stored in the reference-date/time-information storage unit of the content playback apparatus;

acquiring system date/time information of the content playback apparatus;

determining validity of the system date/time information based on a comparison of the system date/time information with the reference date/time information stored in the reference-date/time-information storage unit; and determining whether or not the digital content can be used according to the validity of the system date/time information and the available-period-of-time information for determining the period of time within which the digital content can be used.

15. The method according to claim 14, further comprising:

storing the reference date/time information in a backup information storage unit;

updating the reference date/time information stored in the backup information storage unit with the reference date/time information included in the license based on whether the reference date/time information included in the license is newer than the reference date/time information stored in the backup information storage unit; and restoring the reference date/time information of the reference-date/time-information storage unit by using the reference date/time information stored in the backup information storage unit, based on a determination that the reference-date/time-information storage unit is invalid.

16. The method according to claim 15, further comprising:

searching for a latest license from among at least one license stored in the license storage unit based on a determination that the reference-date/time-information storage unit and the backup information storage unit are invalid; and carrying out restoration using reference date/time information included in the latest license.

17. The method according to claim 15, further comprising:

storing information for uniquely identifying the reference-date/time-information storage unit in the backup information storage unit.

18. The method according to claim 15, further comprising:

storing information for uniquely identifying the stored reference date/time information in at least one of the reference-date/time-information storage unit and the backup information storage unit.

19. A content use management system, comprising:

a license issuance apparatus for issuing a license corresponding to digital content, including a license generation unit for generating the license including at least content identification information for uniquely identifying the digital content, available-period-of-time information for defining a period of time within which the digital content can be used, and reference date/time information; and a license issuance unit for issuing the license; and a content playback apparatus for using the digital content with the license, including a license acquisition unit for acquiring the license;

a license storage unit for storing the license;

a reference-date/time-information storage unit for storing the reference date/time information;

a reference-date/time-information update unit for updating the reference date/time information stored in the reference-date/time-information storage unit with the reference date/time information included in the license based on whether the reference date/time information included in the license is newer than the reference date/time information stored in the reference-date/time-information storage unit;

a system-date/time-information acquisition unit for acquiring system date/time information in the content playback apparatus;

a validation unit for determining validity of the system date/time information based on a comparison of the system date/time information with the reference date/time information stored in the reference-date/time-information storage unit; and a determination unit for determining whether or not the digital content corresponding to the content identification information can be used according to the validity of the system date/time information and the available-period-of-time information.

20. A content playback apparatus for using digital content with a license corresponding to the digital content, comprising:

a license acquisition unit for acquiring the license including available-period-of-time information for defining a period of time within which the digital content can be used and reference date/time information;

a license storage unit for storing the license;

a reference-date/time-information storage unit for storing the reference date/time information;

a reference-date/time-information update unit for updating the reference date/time information stored in the reference-date/time-information storage unit with the reference date/time information included in the license based on whether the reference date/time information included in the license is newer than the reference date/time information stored in the reference-date/time-information storage unit;

a system-date/time-information acquisition unit for acquiring system date/time information of the content playback apparatus;

a validation unit for determining validity of the system date/time information by comparing the system date/time information with the reference date/time information stored in the reference-date/time-information storage unit; and a determination unit for determining whether or not the digital content can be used according to the validity of the system date/time information, and the available-period-of-time information for determining the period of time within which the digital content can be used.

* * * * *